(12) United States Patent
Tomita

(10) Patent No.: US 12,123,750 B2
(45) Date of Patent: *Oct. 22, 2024

(54) ROTATION DETECTION DEVICE

(71) Applicant: Hitachi Metals, Ltd., Tokyo (JP)

(72) Inventor: Kazuhiko Tomita, Tokyo (JP)

(73) Assignee: Proterial, Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/167,898

(22) Filed: Feb. 4, 2021

(65) Prior Publication Data

US 2021/0247208 A1 Aug. 12, 2021

(30) Foreign Application Priority Data

Feb. 7, 2020 (JP) .................. 2020-019854

(51) Int. Cl.
*G01D 5/14* (2006.01)
(52) U.S. Cl.
CPC .................. *G01D 5/145* (2013.01)
(58) Field of Classification Search
CPC ...................................... G01D 5/145
See application file for complete search history.

(56) References Cited

U.S. PATENT DOCUMENTS

| | | | | |
|---|---|---|---|---|
| 6,147,487 A | * | 11/2000 | Sugitani | G01D 5/145 |
| | | | | 324/207.21 |
| 6,231,241 B1 | * | 5/2001 | Ohkuma | G01P 3/443 |
| | | | | 324/173 |
| 8,319,493 B2 | | 11/2012 | Takahashi et al. | |
| 9,103,647 B2 | * | 8/2015 | Takiguchi | G01B 7/003 |
| 9,689,711 B2 | | 6/2017 | Mizunuma et al. | |
| 10,509,050 B2 | | 12/2019 | Welsch et al. | |

(Continued)

FOREIGN PATENT DOCUMENTS

| | | |
|---|---|---|
| JP | 2002-340613 A | 11/2002 |
| JP | 2009-080058 A | 4/2009 |

(Continued)

OTHER PUBLICATIONS

Office Action issued in corresponding Japanese Patent Application No. JP 2020-019854 on Jun. 27, 2023; 11 pages.

(Continued)

*Primary Examiner* — Walter L Lindsay, Jr.
*Assistant Examiner* — Milton Gonzalez
(74) *Attorney, Agent, or Firm* — Studebaker & Brackett PC

(57) ABSTRACT

A rotation detection device includes a sensor unit including a magnetic sensor and a housing portion covering the magnetic sensor. The magnetic sensor includes a plate-shaped detection portion including a magnetic detection element to detect a magnetic field from the detection target member and connection terminals extending out of the detection portion. The magnetic detection element includes a magnetoresistive effect element to detect a magnetic field in a direction perpendicular to a plate thickness direction of the detection portion. The sensor unit is positioned such that a fore-end portion of the detection portion of the magnetic sensor faces toward an axial end face of the detection target member, the fore-end portion being an end portion located opposite to the side where the connection terminals extend out.

7 Claims, 8 Drawing Sheets

(56) References Cited

U.S. PATENT DOCUMENTS

| 11,320,286 B2* | 5/2022 | Tomita .................. G01D 5/145 |
| 2010/0225309 A1 | 9/2010 | Takahashi et al. |
| 2012/0112742 A1* | 5/2012 | Schrader ............... G01D 11/30 |
| | | 324/252 |
| 2015/0177025 A1 | 6/2015 | Mizunuma et al. |
| 2016/0356627 A1 | 12/2016 | Adachi et al. |
| 2018/0024156 A1 | 1/2018 | Welsch et al. |

FOREIGN PATENT DOCUMENTS

| JP | 2015-052494 A | 3/2015 |
| JP | 2015-114209 A | 6/2015 |
| JP | 2015-121459 A | 7/2015 |
| JP | 2015-184094 A | 10/2015 |
| JP | 2018-505417 A | 2/2018 |
| JP | 2019-090789 A | 6/2019 |
| JP | 2019-138877 A | 8/2019 |

OTHER PUBLICATIONS

Office Action issued in corresponding Japanese Patent Application No. JP 2020-019854 on Mar. 7, 2023; 10 pages.
Decision of Dismissal of Amendment issued in corresponding Japanese Patent Application No. JP 2020-019854 on Oct. 24, 2023; 8 pages.
Decision of Refusal issued in corresponding Japanese Patent Application No. JP 2020-019854 on Oct. 24, 2023; 5 pages.
An Office Action; "Notice of Reasons for Refusal," mailed by the Japanese Patent Office on Sep. 3, 2024, issued in Japanese Patent Application No. 2024-003192; with English language translation.

* cited by examiner

ROTATION DETECTION DEVICE

CROSS-REFERENCE TO RELATED APPLICATIONS

The present patent application claims the priority of Japanese patent application No. 2020/019854 filed on Feb. 7, 2020, and the entire contents of Japanese patent application No. 2020/019854 are hereby incorporated by reference.

TECHNICAL FIELD

The present invention relates to a rotation detection device.

BACKGROUND ART

Rotation detection device used on, e.g., a wheel bearing unit to detect a rotational speed of a rotating member rotating with the wheel is conventionally known. The rotation detection device is configured that a magnetic sensor provided in a sensor unit detects a change in a magnetic field caused by an annular magnet (hereinafter, referred to as "detection target member") attached to the rotating member and a rotational speed of the rotating member is thereby detected.

In general, the magnetic sensor has a plate-shaped detection portion including a magnetic detection element to detect a magnetic field from the detection target member, and connection terminals extending out of the detection portion. In the conventional rotation detection device, the sensor unit is arranged so that one surface of the detection portion faces an axial end face of the detection target member (i.e., the detection portion and the axial end face of the detection target member face in a plate thickness direction of the detection portion) (see, e.g., Patent Literature 1). To improve detection accuracy, a distance between the detection target member and the detection portion is generally set as short as possible.

CITATION LIST

Patent Literature

Patent Literature 1: JP 2015/184094 A

SUMMARY OF INVENTION

In recent years, magnetoresistive effect elements (MR elements) are widely used as magnetic detection elements and sensitivity of MR elements has been also greatly improved. In case of using such a highly sensitive MR element as the magnetic detection element and when the sensor unit is arranged in a conventional manner such that one surface of the detection portion faces the axial end face of the detection target member, a change in magnetic flux density at a position for magnetic detection becomes too large since the magnetic detection element is too close to the detection target member, and detection accuracy may decrease due to saturation of a change in resistance value of the magnetic detection element.

To solve this problem, e.g., the detection portion could be provided at a position far from the detection target member inside the sensor unit. In this case, however, the size of the sensor unit may increase. Alternatively, the sensor unit itself could be positioned far from the detection target member, but this may not be possible when an installation space for the sensor unit is narrow.

It is an object of the invention to provide a rotation detection device which can suppress a decrease in detection accuracy even when using a highly sensitive MR element as a magnetic detection element and in which a sensor unit can be reduced in size.

According to an embodiment of the invention, a rotation detection device of the invention comprises:
  a detection target member that is attached to a rotating member and comprises a plurality of magnetic poles along a circumferential direction about a rotational axis of the rotating member; and
  a sensor unit that is attached to a stationary member not rotating with rotation of the rotating member and is arranged to face the detection target member,
  wherein the sensor unit comprises a magnetic sensor and a housing portion covering the magnetic sensor,
  wherein the magnetic sensor comprises a plate-shaped detection portion comprising a magnetic detection element to detect a magnetic field from the detection target member and connection terminals extending out of the detection portion,
  wherein the magnetic detection element comprises a magnetoresistive effect element to detect a magnetic field in a direction perpendicular to a plate thickness direction of the detection portion, and
  wherein the sensor unit is positioned such that a fore-end portion of the detection portion of the magnetic sensor faces toward an axial end face of the detection target member, the fore-end portion being an end portion located opposite to the side where the connection terminals extend out.

Advantageous Effects of Invention

According to an embodiment of the invention, it is possible to provide a rotation detection device which can suppress a decrease in detection accuracy even when using a highly sensitive MR element as a magnetic detection element and in which a sensor unit can be reduced in size.

DESCRIPTION OF EMBODIMENTS

Embodiment

An embodiment of the invention will be described below in conjunction with the appended drawings.

Figure 1:
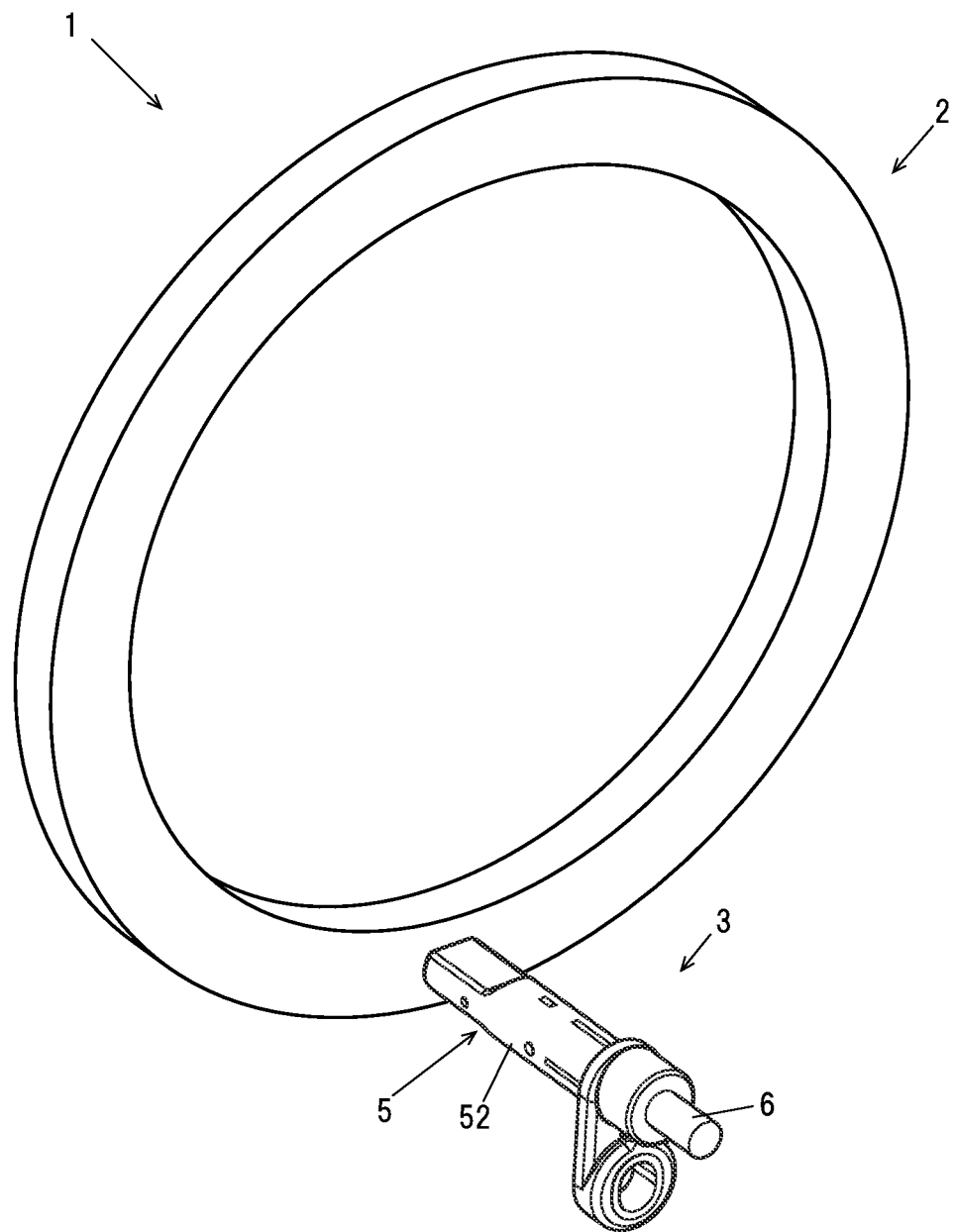
FIG. 1 is a schematic structural view showing a rotation detection device in an embodiment of the present invention.

FIG. 1 is a schematic structural view showing a rotation detection device in the present embodiment. As shown in FIG. 1, a rotation detection device 1 is provided with a detection target member 2 and a sensor unit 3. The rotation detection device 1 is used to detect, e.g., a rotational speed of a wheel of an automobile, i.e., a wheel speed.

(The Detection Target Member 2)

The detection target member 2 is attached to a rotating member (not shown) and rotates with the rotating member. When the rotation detection device 1 is used to detect a wheel speed, the rotating member is, e.g., an inner race that rotates with a wheel attached thereto.

The detection target member 2 is formed in a shape of an annular plate perpendicular to a rotational axis of the rotating member and is attached to, e.g., an outer surface of the rotating member.

In the present embodiment, the detection target member 2 is constructed from a magnetic encoder having plural magnetic poles along a circumferential direction about the rotational axis of the rotating member. The detection target member 2 has N-poles and S-poles that are alternately arranged along the circumferential direction.

(The Sensor Unit 3)

Figure 2:
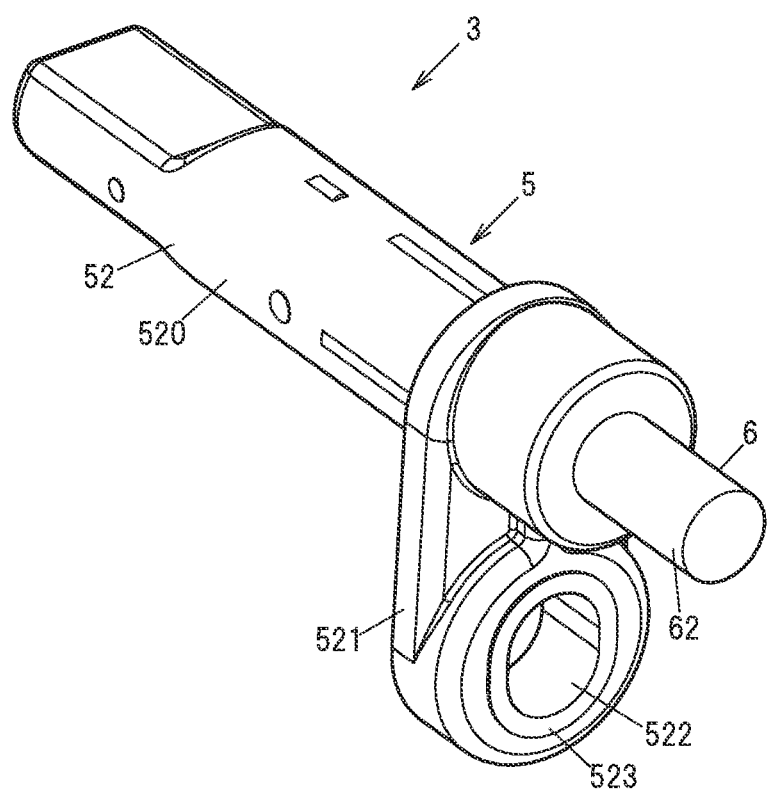
FIG. 2 is a perspective view showing an external appearance of a sensor unit.
Figure 3A:
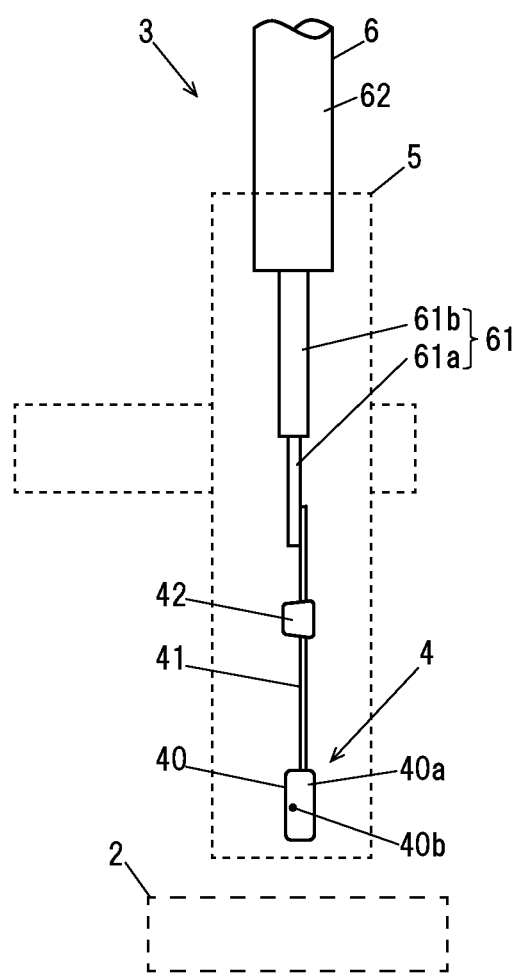
FIG. 3A is a schematic side view showing an internal structure of the sensor unit when viewed in a circumferential direction of a detection target member.
Figure 3B:
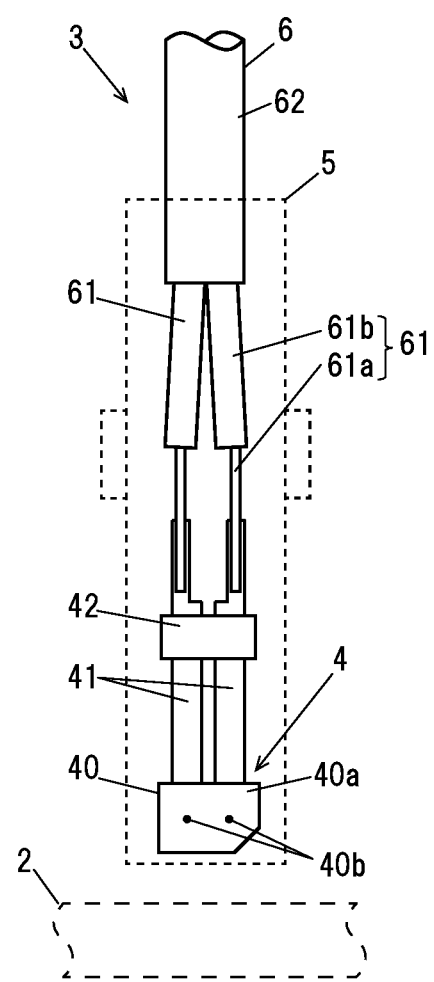
FIG. 3B is a schematic front view showing the internal structure of the sensor unit when viewed in a radial direction of the detection target member.

FIG. 2 is a perspective view showing an external appearance of the sensor unit 3. FIGS. 3A and 3B are schematic diagrams illustrating an internal structure of the sensor unit 3, wherein FIG. 3A is a side view when viewed in the circumferential direction of the detection target member 2 and FIG. 3B is a front view when viewed in a radial direction of the detection target member 2.

As shown in FIGS. 1 to 3, the sensor unit 3 has one magnetic sensor 4, and a housing portion 5 covering the magnetic sensor 4. The sensor unit 3 is provided at an end of a cable 6 and is attached to a stationary member that does not rotate with rotation of the rotating member. When the rotation detection device 1 is used to detect a wheel speed, the stationary member is, e.g., a steering knuckle that is connected to an automobile body and supports an outer race.

The sensor unit 3 is arranged so as to face the detection target member 2. In addition, the sensor unit 3 is positioned so that a fore-end portion, which is an end portion located opposite to the side where the cable 6 extends out, faces an axial end face of the detection target member 2. In more detail, the sensor unit 3 is positioned so that the fore-end portion thereof faces the axial end face of the detection target member 2 in an axial direction of the detection target member 2. The direction of the cable 6 extending from the sensor unit 3 is a direction parallel to the axial direction of the detection target member 2.

The cable 6 has a pair of electric wires 61. Each electric wire 61 has a center conductor 61a constructed from a stranded conductor formed by twisting highly conductive strands of copper, etc., and an insulation 61b formed of an insulating resin such as cross-linked polyethylene and covering the outer surface of the center conductor 61a. The cable 6 also has a sheath 62 covering the pair of electric wires 61 (two electric wires 61).

The pair of electric wires 61 are exposed from the sheath 62 at an end of the cable 6, and the center conductors 61a are further exposed from the insulations 61b at ends of the respective electric wires 61. Afore-end of the center conductor 61a exposed from the insulation 61b is electrically connected to a corresponding connection terminal 41 of the magnetic sensor 4 by welding.

(The Magnetic Sensor 4)

The magnetic sensor 4 has a plate-shaped detection portion 40 including magnetic detection elements (not shown) for detecting a magnetic field from the detection target member 2, and a pair of connection terminals 41 extending out of the detection portion 40.

The magnetic detection element is constructed from an MR element (a magnetoresistive effect element) that detects a magnetic field in a direction perpendicular to a plate thickness direction of the detection portion 40, i.e., in a direction parallel to a surface of the detection portion 40. In the present embodiment, a GMR (Giant Magneto Resistive effect) element is used as the magnetic detection element. Alternatively, an AMR (Anisotropic Magneto Restive) element or a TMR (Tunneling Magneto Resistive) element can be also used as the magnetic detection element.

The detection portion 40 has the magnetic detection elements, a signal processing circuit (not shown), and a resin mold 40a as a cover that covers the magnetic detection elements and the signal processing circuit together. The detection portion 40 is formed in a substantially rectangular plate shape (a rectangular shape in which one of four corners is chamfered) in a plan view.

The pair of connection terminals 41 extend from one long side of the detection portion 40 (a long side not connected to the chamfered corner) in a direction perpendicular to this long side, and the two connection terminals 41 are formed parallel to each other. The both connection terminals 41 are linearly provided without having a bent portion. The both connection terminals 41 are formed in a strip shape (a long plate shape) and tips thereof (ends on the opposite side to the detection portion 40) are electrically connected to the corresponding center conductors 61a of the electric wires 61.

A capacitative element to suppress noise is connected between the two connection terminals 41, and a capacitative element protecting portion 42 formed of a resin mold is provided to cover the capacitative element and a portion of the connection terminals 41 therearound. Hereinafter, an extending direction of the connection terminals 41 is referred to as a length direction of the detection portion 40, and a direction perpendicular to the length direction and the plate thickness direction is referred to as a width direction of the detection portion 40. In addition, an end portion of the detection portion 40 opposite to the side where the connection terminals 41 extend out (an end portion with a long side connected to the chamfered corner) is referred to as a fore-end portion.

The magnetic sensor 4 is positioned so that the fore-end portion of the detection portion 40 faces toward the fore-end portion side of the sensor unit 3. In addition, the detection portion 40 of the magnetic sensor 4 has plural (two to five) magnetic detection elements aligned in the width direction.

In FIG. 3, detection positions for detecting a magnetic field by the magnetic detection elements are denoted by the reference numeral 40b.

The sensor unit 3 of the rotation detection device 1 in the present embodiment is positioned so that the fore-end portion of the detection portion 40 of the both magnetic sensor 4 (the fore-end portion of the sensor unit 3) faces toward the axial end face of the detection target member 2. In more detail, the sensor unit 3 is positioned so that the length direction of the detection portion 40 coincides with the axial direction of the detection target member 2 (so that the length direction of the detection portion 40 is perpendicular to the axial end face of the detection target member 2).

With such a configuration, the magnetic field detection positions 40b can be located at a distance from the detection target member 2 while maintaining a distance (air gap) between the sensor unit 3 and the detection target member 2 at the same level when comparing to the conventional technique in which one surface of the detection portion 40 faces the axial end face of the detection target member 2. By locating the magnetic field detection positions 40b at a distance from the detection target member 2, a change in magnetic flux density at the magnetic field detection positions 40b can be suppressed to relatively small.

As a result, even when an MR element such as highly sensitive GMR element is used as the magnetic detection element, it is possible to suppress a decrease in detection accuracy due to saturation of a change in resistance value. Meanwhile, in case of, e.g., the magnetic sensor 4 configured to be able to detect a rotation direction, it may take time until rotation direction detection becomes effective in the state in which the change in resistance value of the magnetic detection element is saturated. However, in the present embodiment, since the change in magnetic flux density at the magnetic field detection positions 40b can be suppressed to relatively small, it is possible to quickly make rotation direction detection effective.

Furthermore, in the present embodiment, since it is possible to maintain the distance (air gap) between the sensor unit 3 and the detection target member 2 at the same level as the conventional technique, it is easy to arrange the sensor unit 3 even in case that an arrangement space is narrow. Furthermore, since it is not necessary to bend the connection terminals 41 in the present embodiment, it is easy to manufacture and it is possible to avoid a risk such as damage on the detection portion 40 by a bending process. In addition, since it is not necessary to bend the connection terminals 41, the entire sensor unit 3 can be further reduced in size.

In the meantime, the detection portion 40 is configured to calculate a difference between detection values obtained by detecting a magnetic flux density at the both detection positions 40b and output a signal corresponding to the calculated difference through the connection terminals 41. Therefore, when the magnetic sensor 4 is arranged such that, e.g., the width direction of the detection portion 40 coincides with the radial direction of the detection target member 2, detection accuracy may decrease since changes in the magnetic field detected at the two detection positions 40b are substantially the same and the output difference is thus substantially zero.

Figure 4A:
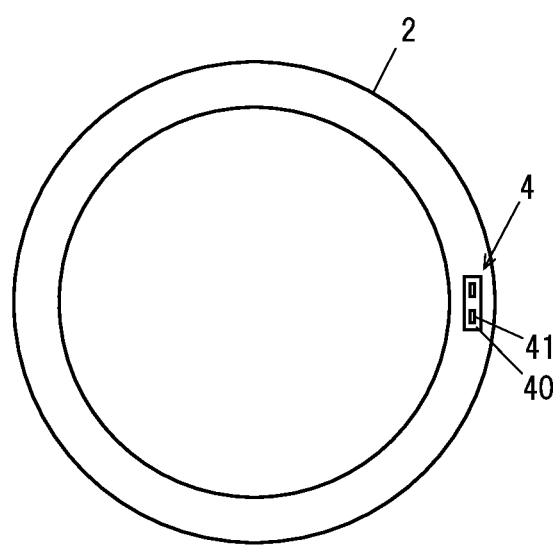
FIG. 4A is an explanatory plan view showing a position of a magnetic sensor relative to the detection target member.
Figure 4B:
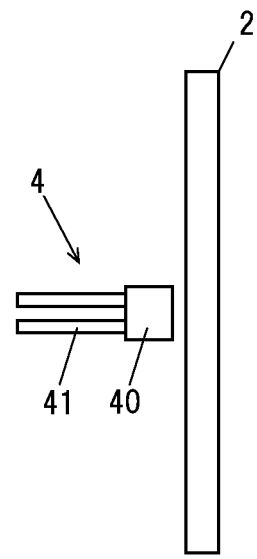
FIG. 4B is an explanatory side view showing the position of the magnetic sensor relative to the detection target member.

Based on this, in the present embodiment, the sensor unit 3 is positioned so that the plate thickness direction of the detection portion 40 coincides with the radial direction of the detection target member 2, as shown in FIGS. 4A and 4B. As a result, a phase of the detected magnetic field is different at the two detection positions 40b and the output difference increases, hence, detection accuracy is improved.

(The Housing Portion 5)

Figure 5:
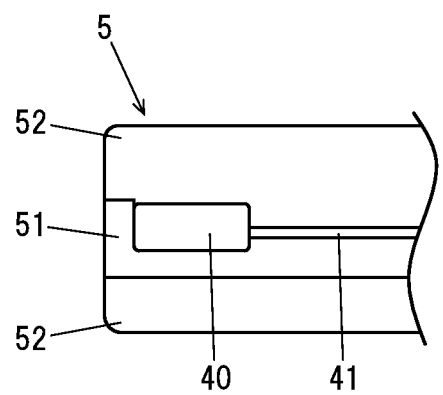
FIG. 5 is a cross sectional view showing an fore-end portion of the sensor unit.

As shown in FIG. 5, the housing portion 5 has a holder 51 holding the magnetic sensor 4, and a resin mold portion 52 covering around the holder 51. The holder 51 is a member for protecting the magnetic sensors 4 and a connection portion between the magnetic sensors 4 and the cable 6 during molding the resin mold portion 52 and is formed beforehand by injection molding, etc. The resin mold portion 52 is formed by molding a resin in a state that the two magnetic sensors 4 and the cable 6 are set on the holder 51, thereby obtaining the housing portion 5.

In the present embodiment, the housing portion 5 is configured so that only the holder 51 constitutes a portion facing the fore-end portion of the detection portion 40. In other words, the housing portion 5 in the present embodiment is configured that the portion facing the fore-end portion of the detection portion 40 is not covered with the resin mold portion 52 and the holder 51 is exposed at a portion facing the detection target member 2 and directly faces the detection target member 2. Thus, a thickness of the housing portion 5 at the fore-end portion of the sensor unit 3 is provided by only one member (the holder 51) and the housing portion 5 can have a very small thickness at the fore-end portion of the sensor unit 3. As a result, it is possible to suppress a decrease in detection accuracy due to too long distance between the magnetic field detection positions 40b and the detection target member 2.

As shown in FIG. 2, the resin mold portion 52 is configured that a main body 520, which covers the magnetic sensor 4, an end of the cable 6 and the holder 51 together, is integrally formed with a flange 521 for fixing the sensor unit 3 to the stationary member. A bolt hole 522 for inserting a bolt (not shown) used to fix the sensor unit 3 to the stationary member is formed on the flange 521, and a metal collar 523 for suppressing deformation of the flange 521 at the time of bolt fixation is provided along the inner circumferential surface of the bolt hole 522.

(Modifications)

Although the magnetic sensor 4 is arranged so that the detection portion 40 is perpendicular to the axial end face of the detection target member 2 in the embodiment described above, the detection portion 40 does not need to be exactly perpendicular to the axial end face of the detection target member 2 and some inclination is acceptable.

Figure 6:
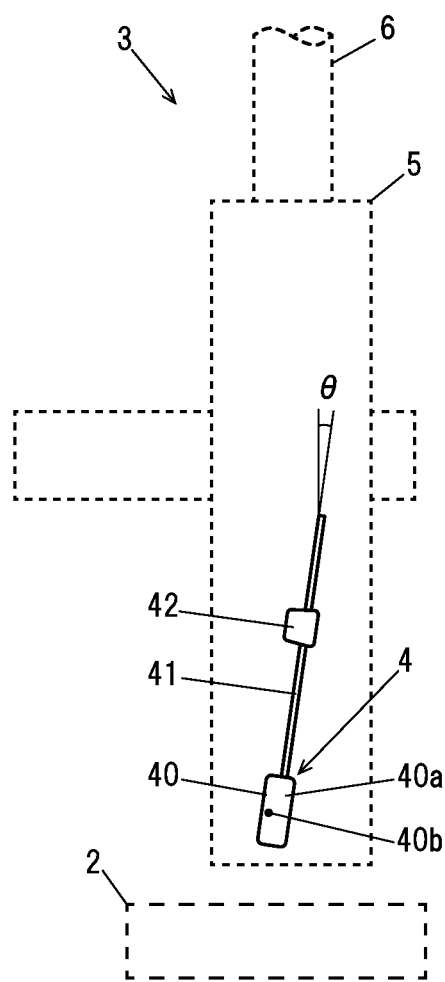
FIG. 6 is a side view showing an internal structure of the sensor unit in a modification of the invention.

In particular, an inclination θ of the length direction of the detection portion 40 relative to the axial direction of the detection target member 2 is not more than 30°, as shown in FIG. 6. It is because the inclination θ of more than 30° may lead to an increase in size of the sensor unit 3.

Figure 7A:
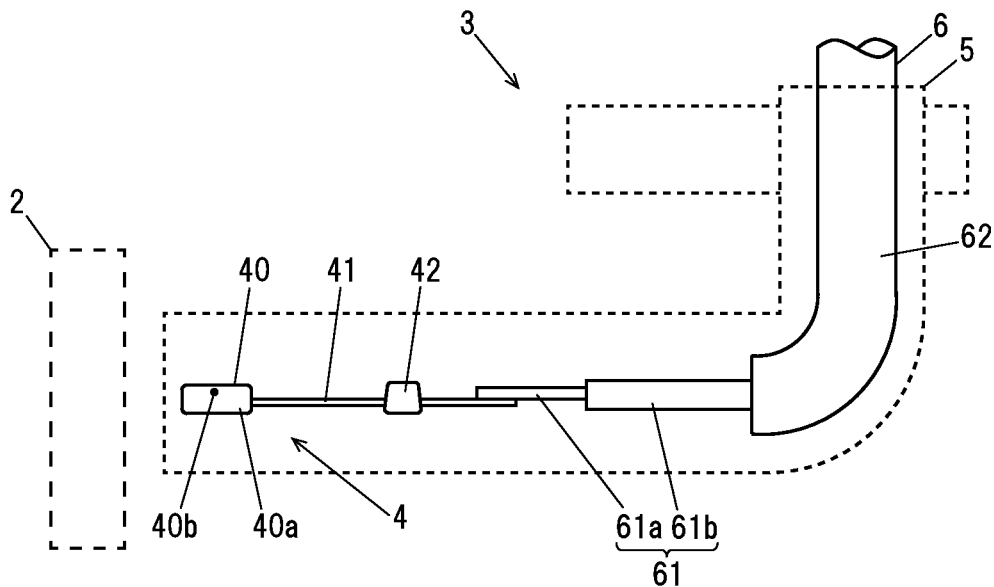
FIG. 7A is a side view showing an internal structure of the sensor unit in another modification of the invention.
Figure 7B:
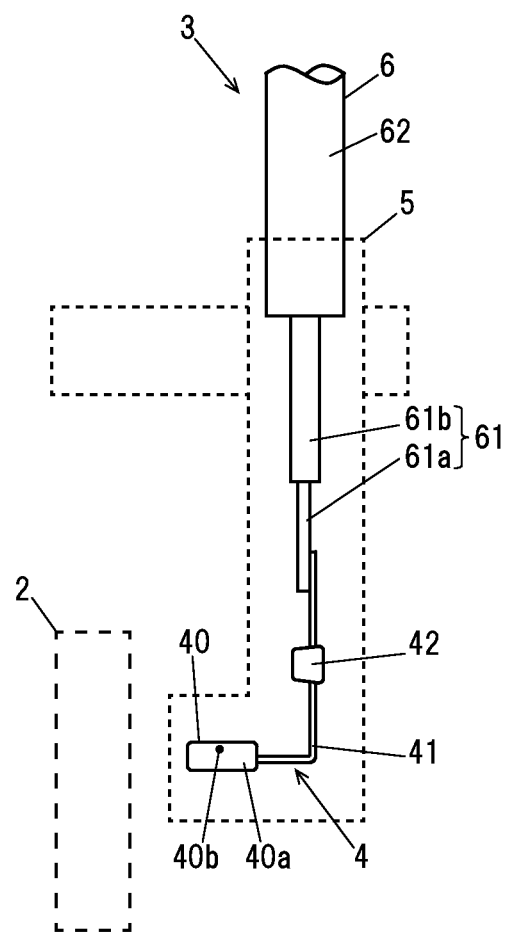
FIG. 7B is a side view showing an internal structure of the sensor unit in another modification of the invention.

In addition, although the example in which the length direction of the detection portion 40 coincides with the direction of the cable 6 extending from the sensor unit 3 has been described in the embodiment, the length direction of the detection portion 40 does not need to coincide with the extending direction of the cable 6. For example, the cable 6 may be bent inside the housing portion 5 as shown in FIG. 7A, or the connection terminals 41 may be bent inside the housing portion 5 as shown in FIG. 7B. Although the cable 6 or the connection terminals 41 are bent at 90° in FIGS. 7A and 7B, the bending angle can be appropriately changed.

In this case, an angle of the fore-end portion of the sensor unit 3 (a direction toward which the fore-end portion of the detection portion 40 faces) relative to the extending direction of the cable 6 can be appropriately changed and the shape of the sensor unit 3 can be flexibly adjusted according to the shape of the stationary member on which the sensor unit 3 is mounted. However, in view of ease of manufacturing, it is preferable that the length direction of the detection portion 40 coincide with the direction of the cable 6 extending from the sensor unit 3.

Figure 8A:
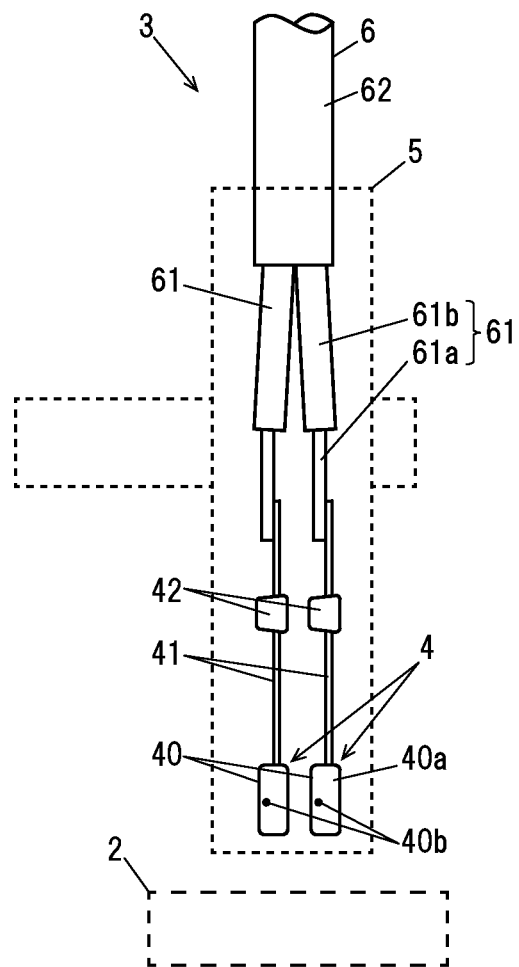
FIG. 8A is a side view showing an internal structure of the sensor unit in another modification of the invention.
Figure 8B:
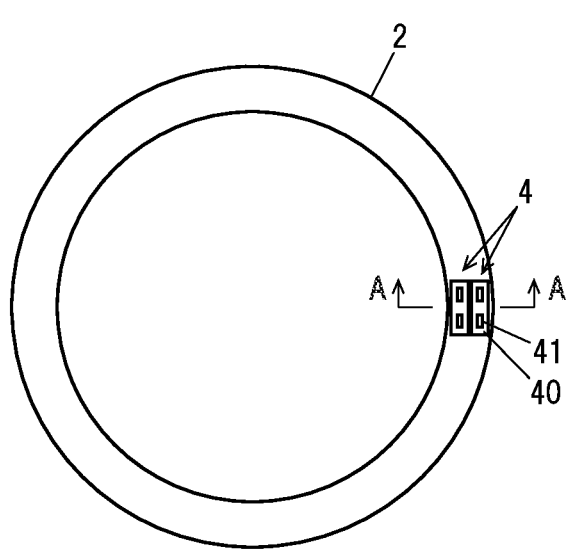
FIG. 8B is an explanatory plan view showing positions of magnetic sensors relative to the detection target member.
Figure 8C:
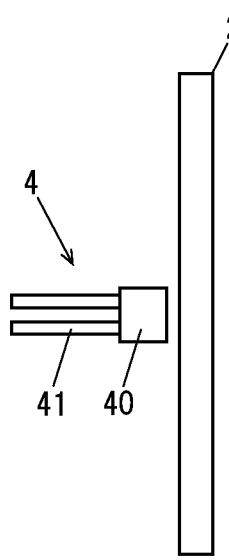
FIG. 8C is a front view when viewing FIG. 8B from a radial direction of the detection target member.

Furthermore, two magnetic sensors 4 may be provided in the sensor unit 3 for redundancy, as shown in FIGS. 8A to 8C. To reduce the size of the sensor unit 3, the two magnetic sensors 4 are desirably arranged so that the detection portions 40 are aligned in the plate thickness direction. In this case, the two magnetic sensors 4 are aligned in the radial direction of the detection target member 2 (see FIG. 8B).

When having two magnetic sensors 4, the sensor unit 3 is positioned so that the fore-end portions of the detection portions 40 of the both magnetic sensors 4 (the fore-end portion of the sensor unit 3) face toward the axial end face of the detection target member 2. This allows the detection portions 40 (the magnetic field detection positions 40b) of the two magnetic sensors 4 to have substantially the same distance from the detection target member 2 and it is also possible to closely arrange the two detection portions 40.

Considering functional safety defined in ISO 26262, it is desired that outputs from the two magnetic sensors 4 be as equal (uniform) as possible, i.e., it is desired to uniformize outputs of the two magnetic sensors 4. In this regard, by arranging the sensor unit 3 so that the fore-end portions of the detection portions 40 of the both magnetic sensors 4 face toward the axial end face of the detection target member 2, it is possible to obtain the same level of outputs from the two magnetic sensors 4 and it is possible to achieve uniform outputs.

Figure 9:
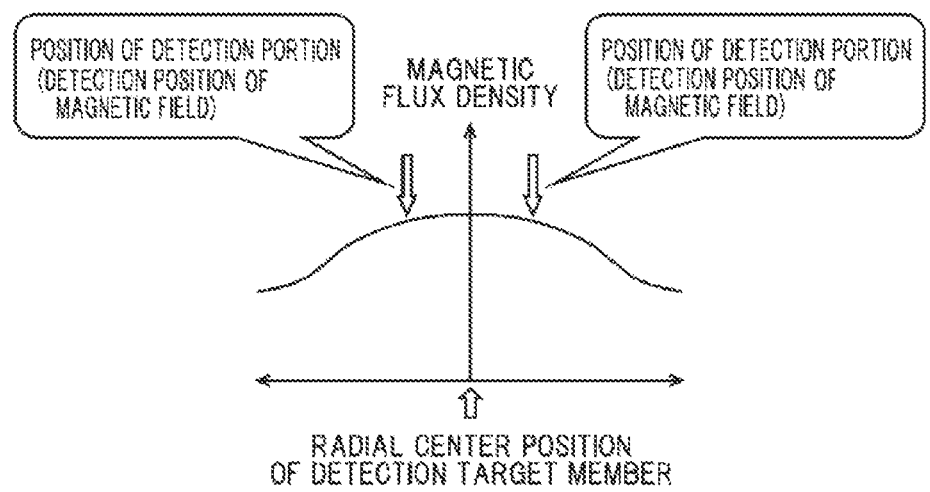
FIG. 9 is a graph showing an example of magnetic flux density distribution across the cross section taken along the line A-A of FIG. 8A.

FIG. 9 shows an example of magnetic flux density distribution across the cross section taken along the line A-A of FIG. 8B. In this example, the magnetic flux density distribution across the cross section of the detection target member 2 taken along the radial direction is symmetric such that the magnetic flux density is highest at the radial center position of the detection target member 2 and decreases as the distance from the radial center position increases, as shown in FIG. 9. Therefore, in this case, by adjusting the position of the sensor unit 3 so that the detection positions 40b of the two magnetic sensors 4 are located at symmetric positions with respect to the radial center position of the detection target member 2, substantially the same outputs are obtained from the both magnetic sensors 4 and it is possible to achieve highly uniform outputs. In this regard, the magnetic flux density distribution in FIG. 9 is an example, and when, e.g., the magnetic flux density is highest at a position off the radial center position of the detection target member 2, the position of the sensor unit 3 is adjusted so that the detection positions 40b of the two magnetic sensors 4 are located at symmetric positions with respect to the position at which such a magnetic flux density is highest.

When using two magnetic sensors 4, it is desirable to arrange the two magnetic sensors 4 with their front surfaces on the same side and the back surfaces on the other side. This is because when, e.g., front and back of the two magnetic sensors 4 are opposite, the two magnetic sensors 4 detect opposite rotation directions and calculation taking into account it needs to be done by a calculation device in a subsequent stage, causing a decrease in versatility. It is possible to make the two magnetic sensors 4 detect the same rotation direction by arranging the two magnetic sensors 4 with their front surfaces on the same side and the back surfaces on the other side, and it is thereby possible to increase versatility.

Functions and Effects of the Embodiment

As described above, in the rotation detection device 1 of the embodiment, the magnetic detection element is constituted from an MR element that detects a magnetic field in a direction perpendicular to the plate thickness direction of the detection portion 40, and the sensor unit 30 is positioned so that the fore-end portion of the detection portion 40 of the magnetic sensor 4 faces toward the axial end face of the detection target member 2.

Thus, the magnetic field detection positions 40b can be located at a distance from the detection target member 2 while maintaining the distance between the sensor unit 3 and the detection target member 2 at the same level as the conventional technique, and the change in magnetic flux density at the magnetic field detection positions 40b thereby can be suppressed to relatively small. As a result, even when a highly sensitive MR element is used as the magnetic detection element and the sensor unit 3 needs to be arranged close to the detection target member 2 due to a narrow arrangement space, it is possible to suppress a decrease in detection accuracy due to saturation of a change in resistance value. Furthermore, since it is not necessary to bend the connection terminals 41, it is easy to manufacture and it is possible to avoid a risk such as damage on the detection portion 40 by a bending process, and also, the rotation detection device 1 having a small sensor unit 3 can be realized by suppressing an increase in size of the sensor unit 3 due to bending of the connection terminals 41.

In addition, according to the present embodiment, it is possible to realize the sensor unit 3 using a conventional sensor unit simply by replacing the magnetic sensor using a Hall element with the magnetic sensor 4 using an MR element, hence, high versatility.

SUMMARY OF THE EMBODIMENTS

Technical ideas understood from the embodiment will be described below citing the reference numerals, etc., used for the embodiment. However, each reference numeral, etc., described below is not intended to limit the constituent elements in the claims to the members, etc., specifically described in the embodiment.

[1] A rotation detection device (1), comprising: a detection target member (2) that is attached to a rotating member and comprises a plurality of magnetic poles along a circumferential direction about a rotational axis of the rotating member; and a sensor unit (3) that is attached to a stationary member not rotating with rotation of the rotating member and is arranged to face the detection target member (2), wherein the sensor unit (3) comprises a magnetic sensor (4) and a housing portion (5) covering the magnetic sensor (4), the magnetic sensor (4) comprising a plate-shaped detection portion (40) comprising a magnetic detection element to detect a magnetic field from the detection target member (2) and connection terminals (41) extending out of the detection portion (40), the magnetic detection element comprises a magnetoresistive effect element that detects a magnetic field in a direction perpendicular to a plate thickness direction of the detection portion (40), and the sensor unit (3) is positioned so that a fore-end portion of the detection portion (40) of the magnetic sensor (4) faces toward an axial end face of the detection target member (2), the fore-end portion being an end portion located opposite to the side where the connection terminals (41) extend out.

[2] The rotation detection device (1) defined in [1], wherein the connection terminals (41) are linearly provided without having a bent portion.

[3] The rotation detection device (1) defined in [1] or [2], wherein the detection portion (40) comprises a plurality of the magnetic detection elements that are aligned in a width direction that is perpendicular to a length direction coinciding with an extending direction of the connection terminals (41) and also perpendicular to the plate thickness direction, and the sensor unit (3) is positioned so that the plate thickness direction of the detection portion (40) coincides with a radial direction of the detection target member (2).

[4] The rotation detection device (1) defined in any one of [1] to [3], wherein the housing portion (5) comprises a holder (51) holding the magnetic sensor (4) and a resin mold portion (52) covering around the holder (51), and the housing portion (5) is configured such that a portion facing the fore-end portion of the detection portion (40) comprises only the holder (51).

[5] The rotation detection device (1) defined in any one of [1] to [4], wherein the sensor unit (3) comprises two of the magnetic sensors (4), and the two magnetic sensors (4) are arranged so that the detection portions (40) are aligned in the plate thickness direction of the detection portions (40).

Although the embodiment of the invention has been described, the invention according to claims is not to be limited to the embodiment described above. Further, please note that all combinations of the features described in the embodiment are not necessary to solve the problem of the invention. In addition, the invention can be appropriately modified and implemented without departing from the gist thereof.

REFERENCE SIGNS LIST

1 ROTATION DETECTION DEVICE
2 DETECTION TARGET MEMBER
3 SENSOR UNIT
4 MAGNETIC SENSOR
40 DETECTION PORTION
40a RESIN MOLD
40b DETECTION POSITION FOR DETECTING MAGNETIC FIELD
41 CONNECTION TERMINAL
42 CAPACITATIVE ELEMENT PROTECTING PORTION
5 HOUSING PORTION
51 HOLDER
52 RESIN MOLD PORTION
6 CABLE

The invention claimed is:

1. A rotation detection device, comprising:
a detection target member formed in an annular shape that is attached to a rotating member and comprises a plurality of magnetic poles along a circumferential direction about a rotational axis of the rotating member, and
a sensor unit that is attached to a stationary member not rotating with rotation of the rotating member and is arranged to face the detection target member,
wherein the sensor unit comprises a magnetic sensor and a housing portion covering the magnetic sensor,
wherein the magnetic sensor comprises a plate-shaped detection portion comprising a magnetic detection element to detect a magnetic field from the detection target member and a plurality of connection terminals extending out of the detection portion,
wherein the magnetic detection element comprises a magnetoresistive effect element to detect a magnetic field in a direction perpendicular to a plate thickness direction of the detection portion,
wherein the sensor unit is positioned such that a fore-end portion of the detection portion of the magnetic sensor faces toward an axial end face of the detection target member, the fore-end portion being an end portion located opposite to the side where the plurality of connection terminals extend out,
wherein the detection portion is arranged adjacent to the detection target member as viewed from a direction of the rotational axis,
wherein the plurality of connection terminals align in a direction crossing a radial direction of the detection target member, and are extending out from the detection portion in the direction of the rotational axis from an axial end face-side,
wherein the housing portion comprises a facing portion that faces the detection target member and a thickness of the facing portion is thinner than a radial width of the detection target member,
wherein the housing portion comprises a holder holding the magnetic sensor and a resin mold portion covering around the holder, and
wherein the housing portion is configured such that a portion facing the fore-end portion of the detection portion comprises only the holder and the detection portion is covered by the resin mold portion except for the fore-end portion.

2. The rotation detection device according to claim 1, wherein the connection terminals are linearly provided without having a bent portion.

3. The rotation detection device according to claim 1, wherein the detection portion comprises a plurality of the magnetic detection elements that are aligned in a width direction that is perpendicular to a length direction coinciding with an extending direction of the connection terminals and also perpendicular to the plate thickness direction, and the sensor unit is positioned such that the plate thickness direction coincides with the radial direction of the detection target member.

4. The rotation detection device according to claim 1, wherein the sensor unit comprises two of the magnetic sensors, and the two magnetic sensors are arranged such that the detection portion is aligned in the plate thickness direction.

5. The rotation detection device according to claim 1, wherein the sensor unit comprises two of the magnetic sensors, and the two magnetic sensors are arranged such that the detection portion is aligned in the radial direction of the detection target member.

6. The rotation detection device according to claim 5, wherein the two magnetic sensors are arranged above the detection target member as viewed from the direction of the rotational axis.

7. The rotation detection device according to claim 1, wherein a width of the detection portion in the radial direction of the detection target member is narrower than a width of the detection target member.

* * * * *